US009379632B2

(12) United States Patent
Akagi et al.

(10) Patent No.: US 9,379,632 B2
(45) Date of Patent: Jun. 28, 2016

(54) POWER CONVERTER AND METHOD FOR CONTROLLING SAME

(75) Inventors: Hirofumi Akagi, Tokyo (JP); Makoto Hagiwara, Tokyo (JP)

(73) Assignee: Tokyo Institute of Technology, Tokyo (JP)

( * ) Notice: Subject to any disclaimer, the term of this patent is extended or adjusted under 35 U.S.C. 154(b) by 200 days.

(21) Appl. No.: 13/979,235

(22) PCT Filed: Jan. 18, 2012

(86) PCT No.: PCT/JP2012/050982
§ 371 (c)(1),
(2), (4) Date: Jul. 11, 2013

(87) PCT Pub. No.: WO2012/099176
PCT Pub. Date: Jul. 26, 2012

(65) Prior Publication Data
US 2014/0103887 A1    Apr. 17, 2014

(30) Foreign Application Priority Data

Jan. 18, 2011  (JP) ................................ 2011-008112

(51) Int. Cl.
*G05F 5/00*   (2006.01)
*H02M 5/293*  (2006.01)
(Continued)

(52) U.S. Cl.
CPC ............. *H02M 5/293* (2013.01); *H02J 3/1857* (2013.01); *H02M 7/49* (2013.01); *Y02E 40/26* (2013.01)

(58) Field of Classification Search
CPC ... H02M 1/42; H02M 1/4225; H02M 1/4216; H02M 1/4233; H02M 1/4241; H02M 1/4208; H02M 7/49; H02M 7/483; H02M 7/4835; H02M 7/4815; H02M 7/487; H02M 5/293; H02M 2007/4835; H02M 2007/483; H02J 3/18; H02J 3/1857; H02J 3/1821; H02J 3/1835; H02J 1/1842; H02J 1/36; Y02E 40/12; Y02E 40/26; Y02E 40/123; Y02E 40/126; Y02E 40/30; Y02E 40/32; Y02E 40/34; Y02E 40/14; Y02E 40/16; Y02E 40/18

USPC ......... 323/205–211, 268–275, 282–285, 351; 363/15–17, 21.02, 21.03, 34, 35, 363/37–43, 65, 71, 84–89, 95–98, 123–129, 363/131, 132, 135–137
See application file for complete search history.

(56) References Cited

U.S. PATENT DOCUMENTS 5,642,275 A  *  6/1997  Peng et al. .................... 363/137

FOREIGN PATENT DOCUMENTS

JP      2007-280358 A    10/2007
WO   2011/129223 A1    10/2011

OTHER PUBLICATIONS

L. Maharjan, "A transformerless energy storage system based on a cascade multilevel PWM converter with star configuration", IEEE Transactions on Industry Applications, vol. 44, No. 5, Sep./Oct. 2008, pp. 1621-1630.*

(Continued)

*Primary Examiner* — Timothy J Dole
*Assistant Examiner* — Carlos Rivera-Perez
(74) *Attorney, Agent, or Firm* — Kilpatrick Townsend & Stockton LLP

(57) ABSTRACT

A power converter 100 includes a DC capacitor C, semiconductor switch groups each of which includes semiconductor switches connected in series to each other, bridge-cells 11*u-j*, 11*v-j*, and 11*w-j* each of which includes the DC capacitor C and two semiconductor switch groups connected in parallel to the DC capacitor C, a delta connection unit 10 including delta-connected bridge-cells and a integrated control unit 1 for controlling a circulating current flowing in the delta connection unit such that each of DC-capacitor by-phase average values follows a DC-capacitor three-phase average value, each of the DC-capacitor by-phase average values being obtained by averaging voltage values of the DC capacitors at a corresponding phase of three phases, and the DC-capacitor three-phase average value being obtained by averaging voltage values of the DC capacitors at all of the three phases.

10 Claims, 13 Drawing Sheets

(51) Int. Cl.
*H02J 3/18* (2006.01)
*H02M 7/49* (2007.01)

(56) References Cited

OTHER PUBLICATIONS

International Search Report dated Apr. 24, 2012 corresponding to PCT/JP2012/050982 (2 pages).
Fujii, Kansuke et al., "Comparison of Hard-Switched Multi-Level Inverter Topologies for Statcom by Loss-Implemented Simulation and Cost Estimation," Power Electronics Specialists Conference (2005). PESC '05. IEEE 36th, Jun. 16, 2005, pp. 340-346, ISBN: 0/7803-9033-4.
Hagiwara, Makoto et al., "PWM Control and Experiment of Modular Multilevel Converters," *Thesis Journal D of Institute of Electrical Engineers of Japan* (Jul. 2008), 128(7):957-965.
Akagi, Hirofumi et al., "Classification and Terminology of Modular Multilevel Cascade Converters (MMC)," *National Convention of Institute of Electrical Engineers of Japan* (Mar. 2010), 4-043: 71-72.
Usuki, Kazuhiro et al., "Development of SVC Control for Suppressing Voltage Fluctuations," *IEEE. Rec, IEEE-ICPE* (2011) pp. 2073-2080.
Yoshii, Tsurugi et al., "A 6.6-kV Transformerless Cascade PWM STATCOM," *Thesis Journal D of Institute of Electrical Engineers of Japan* (May 2007), 127(8):781-788.
Utsu, Katuya et al., "Leading-Edge Control Technique of Flicker Compensating System," *Fjui Electric Journal* (Feb. 2007), 80(2):131-134.

* cited by examiner (a)

(b)

(c)

(a)

(b)

(c)

(a)

(b)

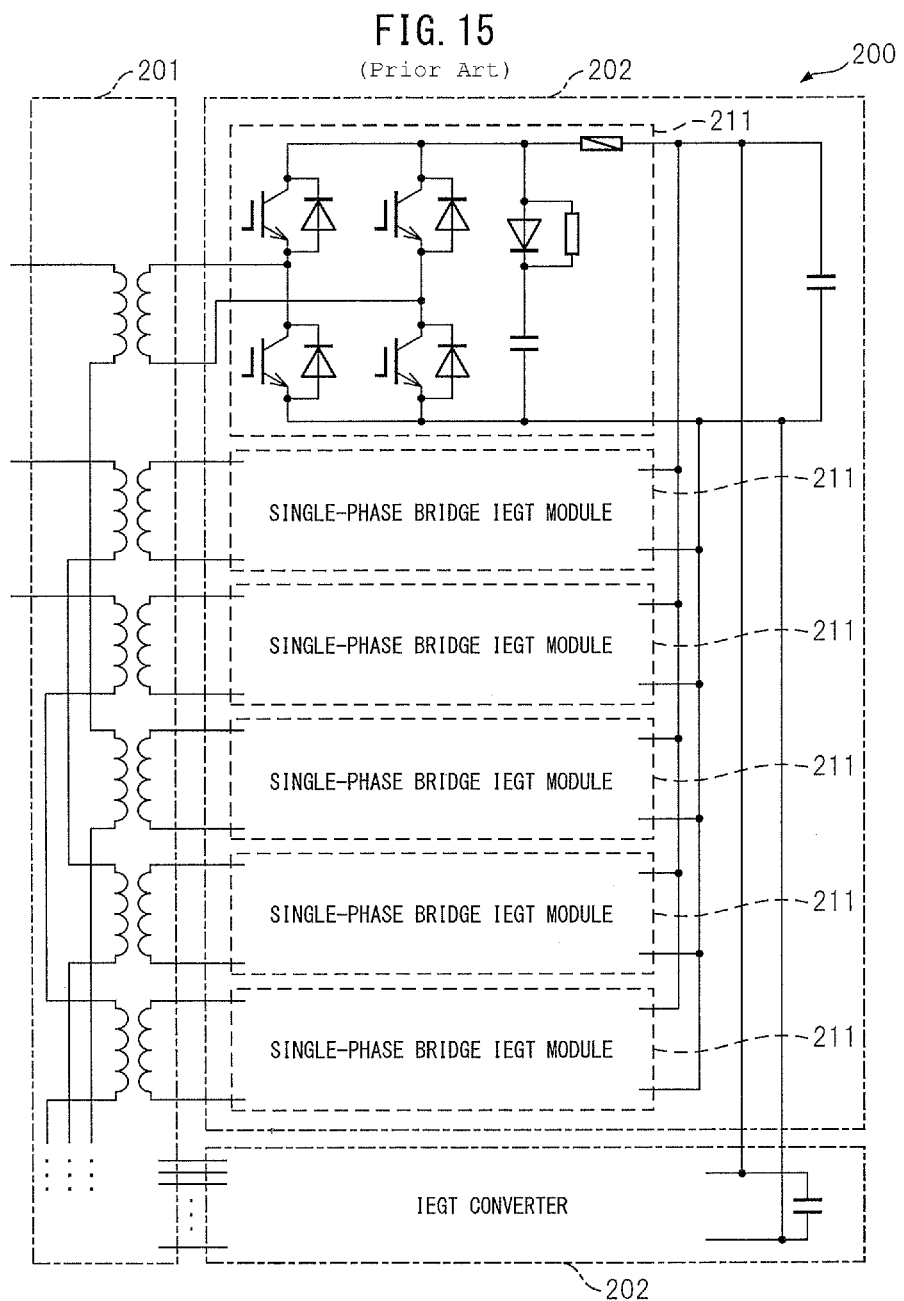

POWER CONVERTER AND METHOD FOR CONTROLLING SAME

TECHNICAL FIELD

The present invention relates to a power converter and a method for controlling the same. Particularly, the present invention relates to a power converter of a modular multilevel cascade power converter type and a method for controlling the same.

BACKGROUND

A modular multilevel cascade converter (MMCC) is known as a next generation transformerless power converter that is easily mounted and is suitable for large-capacity and high-voltage use. The modular multilevel cascade converter is expected to be applied to a static synchronous compensator (STATCOM).

The modular multilevel cascade converter has a feature in cascade connection of converter cells. The modular multilevel cascade converter can be classified into four types on the basis of circuit configurations of a converter cell, and arm connection methods (refer to Non-Patent Literature 2, for example).

One of these types is a static synchronous compensator that uses a modular multilevel cascade converter based on single-star bridge-cells (MMCC-SSBC) that has a feature of good expandability and redundancy (refer to Non-Patent Literature 3, for example). However, because of star-connection (Y-connection), a circulating current cannot be made to flow between phases, and it is difficult to control negative-sequence reactive power.

However, in a static synchronous compensator using a modular multilevel cascade converter based on single-delta bridge-cells (MMCC-SDBC), a circulating current flows in a delta connection line. Accordingly, controlling this circulating current allows an adjustment of negative-sequence reactive power (refer to Non-Patent Literature 4, for example).

FIG. 12 is a circuit diagram of a modular multilevel cascade-type power converter based on single-delta bridge-cells.

A modular multilevel cascade-type power converter 100 based on single-delta bridge-cells includes a delta connection unit inside the power converter 100. Provided in each phase in the delta connection unit is one bridge-cell or a plurality of bridge-cells connected in series to each other. In other words, one bridge-cell or a plurality of bridge-cells connected in series to each other are provided in each of the phases u, v and w in the delta connection unit. In an example illustrated in FIG. 12, in each of the phases in the delta connection unit, three respective bridge-cells 11u-j, 11v-j, and 11w-j (j=1 to 3) are provided. Note that the number of the bridge-cells provided in each phase in the delta connection unit is not limited to three. In other words, one bridge-cell or a plural number of bridge-cells connected in series to each other may be provided in each phase. In FIG. 12, the symbol L expresses a reactor component in each phase in the delta connection unit of the power converter 100.

Each of the bridge-cells 11u-j, 11v-j, and 11w-j (j=1 to 3) includes a direct current (DC) capacitor C, and two semiconductor switch groups that are arranged in parallel with the DC capacitor C. Each semiconductor switch group includes two semiconductor switches connected in series to each other. The semiconductor switch includes a semiconductor switching device that causes a current to flow in one direction through itself at the time of being turned on, and a feedback diode connected in antiparallel to the semiconductor switching device.

In FIG. 12, the symbols $V_{Su}$, $V_{Sv}$, and $V_{Sw}$ indicate phase voltages at respective phases of power supply voltages on the side of a system, the symbols $i_u$, $i_v$, and $i_w$ indicate currents (referred to as "power supply current" in the following) at the respective phases. The symbols $i_{uv}$, $i_{vw}$, and $i_{wu}$ indicate currents (referred to as "converter current" in the following) each flowing into the respective phases in the delta connection unit of the power converter 100. Further, the symbols $v_{uv}$, $v_{vw}$, and $v_{wu}$ indicate output voltages of the respective phases in the delta connection unit of the power converter 100, i.e., inter-line voltages of the output terminals of the power converter 100. The symbols $V_{Cju}$, $V_{Cjv}$, and $V_{Cjw}$ (j=1 to 3) indicate voltages of the DC capacitors in each of the bridge-cells 11u-j, 11v-j, and 11w-j. In the following, the elements to which the same reference symbol is assigned in the different drawings are elements having the same function.

For example, in an arc furnace, a large-capacity flicker compensating device capable of performing high-speed control of reactive power of a positive-sequence and a negative-sequence, and capable of performing control of low-frequency active power is used in order to suppress voltage drop or voltage fluctuation caused by the arc furnace. FIG. 13 illustrates a general configuration of a flicker compensating device. Generally, a flicker compensating device 200 is connected in parallel with an arc furnace 500 that is connected in series to a three-phase power supply 300 via an interconnection transformer 400. In FIG. 13, the point of common coupling (PCC) expresses a connection point to a system of the flicker compensating device 200. The symbols p and q each express an instant active power and an instant reactive power sent and received between the PCC and the flicker compensating device 200. A load current $i_L$ flowing into the art arc furnace 500 includes not only a positive-sequence active current, but also a positive-sequence reactive current, a negative-sequence reactive current, and a low-frequency active current that induce a voltage flicker. When the flicker compensating device 200 is not provided, these currents appear directly in a power supply current $i_S$ so that a voltage flicker is generated. In order to suppress such a voltage flicker, the flicker compensating device 200 generates a compensating current $i_C$.

As such a flicker compensating device, there is a flicker compensating device that uses a thyristor called a static var compensator (SVC) and that has been used before the 1980s (refer to Non-Patent Literature 5, for example). FIG. 14 is a circuit diagram illustrating a flicker compensating device 200 using the SVC. The flicker compensating device 200 using the SVC includes a thyristor controlled reactor (TCR) and a thyristor switched capacitor (TSC). The TCR includes thyristors $T_r$ connected in antiparallel to each other, and a reactor $L_1$ connected in series to the thyristors $T_r$, as illustrated in FIG. 14A. The TSC includes thyristors $T_r$ connected in antiparallel to each other, and a capacitor $C_1$ and a reactor $L_2$ connected in series to the thristors $T_r$, as illustrated in FIG. 14B.

In 2000s, a flicker compensating device using a self-excited static synchronous compensator (STATCOM) was put to practical use (refer to Non-Patent Literature 6, for example). FIG. 15 is a circuit diagram illustrating a flicker compensating device described in Non-Patent Literature 6. The flicker compensating device 200 using the STATCOM described in Non-Patent Literature 6 uses a plurality of IEGT converters 202 including a self-arc-extinction device called IEGT, and thereby accomplishing large capacity. The respective IEGT converters 202 are connected to each other in multi-stages via multi-winding coil transformers 201. A power converter including such multi-winding coil transformers has a large capacity, and can control negative-sequence reactive power. Accordingly, this power converter is suitable for use as such a static synchronous compensator.

LIST OF NON-PATENT LITERATURES

[Non-Patent Literature 1] Makoto Hagiwara, Hirofumi Akagi, "PWM Control Method and Operational Inspection of Modular Multilevel Converter (MMC)", Thesis Journal D of Institute of Electrical Engineers of Japan, Vol. 128, No. 7, pp 957-965, July 2008

[Non-Patent Literature 2] Hirofumi Akagi, Makoto Hagiwara, "Classification and Names Terminology of Modular Multilevel Cascade Converters (MMCC)", National Convention of Institute of Electrical Engineers of Japan, No. 4-043, pp 71-72, March 2010

[Non-Patent Literature 3] Tsurugi Yoshii, Shigenori Inoue, Hirofumi Akagi, "6.6 kV Transformerless Cascade PWM STATCOM", Thesis Journal D of Institute of Electrical Engineers of Japan, Vol. 127, No. 8, pp 781-788, May 2007

[Non-Patent Literature 4] K. Fujii, U. Schwarzer, R. W. De Doncker, "Comparison of Hard-Switched Multi-Level Inverter Topologies for STATCOM by Loss-Implemented Simulation and Cost Estimation", (U.S.) IEEE. Rec, IEEE-PESC, pp 340-346, June 2005

[Non-Patent Literature 5] Katuya Utsu, Hiroshi Shinohara, Akio Suzuki, "Leading-Edge Control Technique of Flicker Compensating System", Fuji Electric Journal, Vol. 80, No. 2, pp 131-134, February 2007

[Non-Patent Literature 6] K. Usuki, F. Aoyama, M. Hanamatsu, "Development of SVC Control for Suppressing Voltage Fluctuations", (U.S.), IEEE. Rec, IEEE-ICPE, pp 2073-2080, 2011

SUMMARY OF THE INVENTION

As described above, a modular multilevel cascade-type power converter based on single-delta bridge-cells (MMCC-SDBC) has a large capacity, and can control negative-sequence reactive power. Accordingly, this power converter is suitable for use as a static synchronous compensator.

However, in the modular multilevel cascade-type power converter based on single-delta bridge-cells, control of stably maintaining a voltage of a DC capacitor in each of the bridge-cells is to be performed. Particularly, when this power converter is used as a static synchronous compensator, a voltage of the DC capacitor is stably maintained and controlled in all operational modes while positive-sequence and negative-sequence reactive power are controlled at a high speed, and active power of low frequency is controlled.

There is a demand for further improvement in a flicker compensating ratio of a flicker compensating device. An amount ΔV10 is used as a measure that expresses a flicker generation amount and that was developed by the then Japanese Electric Heat Association Arc Furnace Committee. The amount ΔV10 is obtained by reflecting a visual sensitivity coefficient in a ratio of an effective value (V) of voltage fluctuation per minute when a system is converted into 100V system. A flicker compensating rate is an index indicating a degree by which the amount ΔV10 is decreased by using a flicker compensating device. A flicker compensating ratio takes a value ranging from 0% to 100%, and a larger value of these numbers indicates a higher flicker compensating ratio.

A flicker compensating device using the SVC described in Non-Patent Literature 5 has advantages that capacity is easily made large, and cost is low. However, a flicker compensating ratio is low. According to Non-Patent Literature 5, a value of the flicker compensating ratio is 57.6%.

A flicker compensating ratio of a flicker compensating device including the STATCOM using IEGT devices, described in Non-Patent Literature 6, is larger than that of the flicker compensating device using the SVC, described in Non-Patent Literature 5. According to Non-Patent Literature 6, a value of the former flicker compensating ratio is 74%. However, according to the flicker compensating device described in Non-Patent Literature 6, multi-winding coil transformer for increasing a converter capacity exists, so that a volume and a weight are increased, and in addition, cost is high.

Accordingly, an object of the present invention is to provide a modular multilevel cascade-type power converter based on single-delta bridge-cells that can stably control a DC capacitor in various operational modes, and to provide a controlling method for this power converter.

In order to accomplish the above-described object, according to the present invention, a modular multilevel cascade-type power converter based on single-delta bridge-cells includes:

a DC capacitor;

semiconductor switch groups each of which includes two semiconductor switches connected in series to each other;

one or a plurality of bridge-cells each of which includes the DC capacitor, and the two semiconductor switch groups that are connected in parallel to the DC capacitor;

a delta connection unit at which bridge-cells are delta-connected wherein each of the bridge-cells includes the one bridge-cell or the plurality of bridge-cells that are connected in series to each other; and a control unit for controlling a circulating current flowing in the delta connection unit such that each of DC-capacitor by-phase average values follows a DC-capacitor three-phase average value, wherein each of the DC-capacitor by-phase average values is obtained by averaging voltage values of the DC capacitors at a corresponding phase of three phases, and the DC-capacitor three-phase average value is obtained by averaging voltage values of the DC capacitors at all of the three phases.

In other words, according to the present invention, a modular multilevel cascade-type power converter based on single-delta bridge-cells includes:

a bridge-cell including a DC capacitor, and two semiconductor switch groups connected in parallel to the DC capacitor, each of the two semiconductor switch groups including two semiconductor switches connected in series to each other;

a delta connection unit at which bridge-cells are delta-connected, each of the bridge-cells including one bridge-cell or a plurality of the bridge-cells that are connected in series to each other; and a control unit for controlling a circulating current flowing in the delta connection unit such that each of DC-capacitor by-phase average values follows a DC-capacitor three-phase average value, each of the DC-capacitor by-phase average values being obtained by averaging voltage values of the DC capacitors at a corresponding phase of three phases, and the DC-capacitor three-phase average value being obtained by averaging voltage values of the DC capacitors at all of the three phases.

According to the present invention, a method for controlling a power converter in which one or a plurality of bridge-cells connected in series to each other are provided at each of three phases in a delta connection unit, each of the bridge-cells being configured by connecting two semiconductor switch groups, each of which includes two semiconductor switches connected in series to each other, to a DC capacitor in parallel, the method including:

generating a DC-capacitor three-phase average value and DC-capacitor by-phase average values, the DC-capacitor three-phase average value being generated by averaging voltage values of the DC capacitors at all of the three phases, and each of the DC-capacitor by-phase average values being generated by averaging voltage values of the DC capacitors at a corresponding phase of the three phases; and controlling a value of a circulating current flowing in the delta connection unit such that each of the DC capacitor by-phase average values follows the DC-capacitor three-phase average value.

According to the present invention, a modular multilevel cascade-type power converter based on single-delta bridge-cells is capable of stably maintaining and controlling voltages of the DC capacitors in all operational modes, while high-speed control of positive-sequence and negative-sequence reactive power, and control of low-frequency active power are being performed.

BRIEF DESCRIPTION OF THE DRAWINGS

FIG. 15 is a circuit diagram illustrating a flicker compensating device described in Non-Patent Literature 6.

EMBODIMENTS OF THE INVENTION

Figure 1:
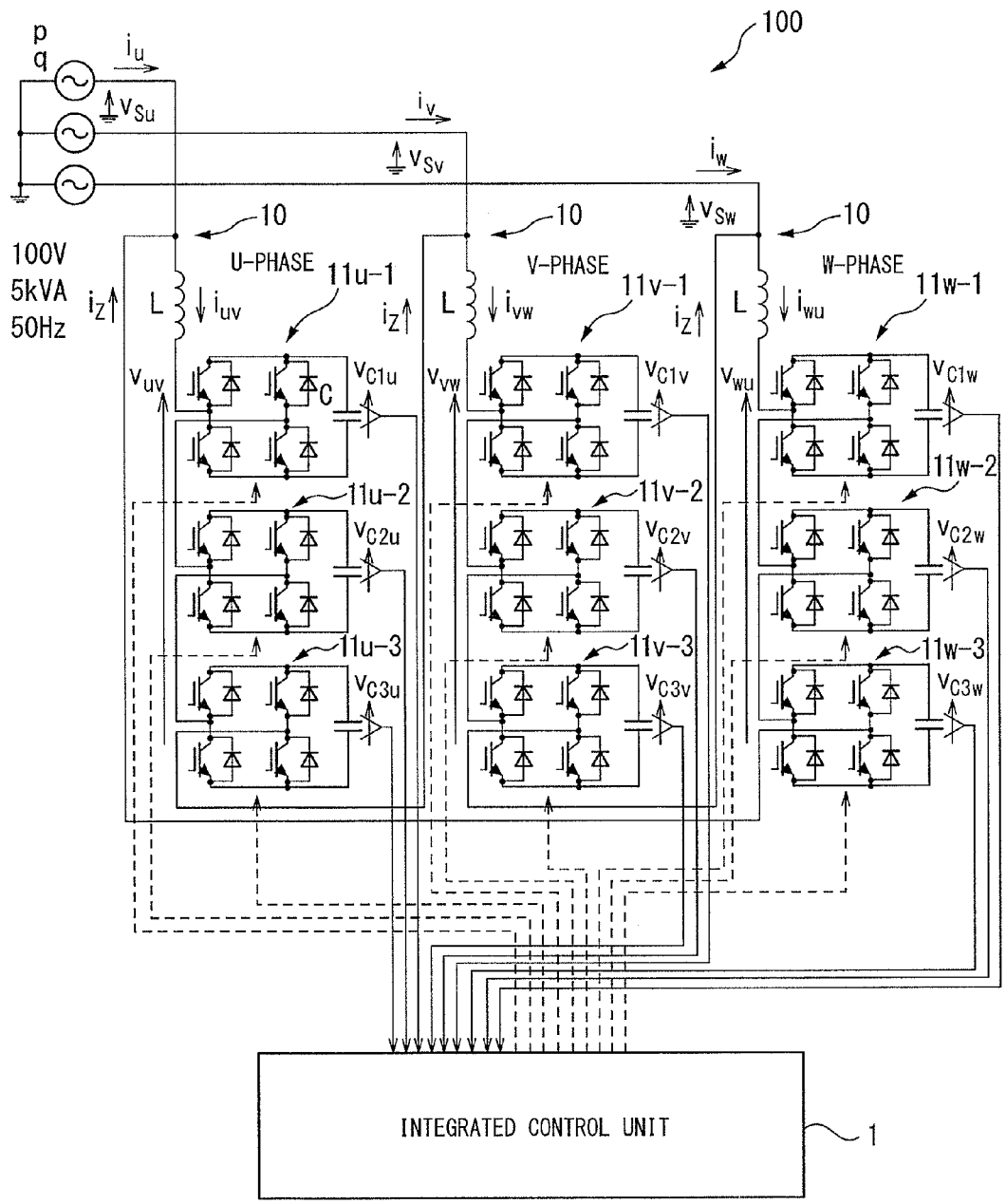
FIG. 1 is a circuit diagram of a modular multilevel cascade-type power converter based on single-delta bridge-cells according to an embodied example of the present invention.
Figure 12:
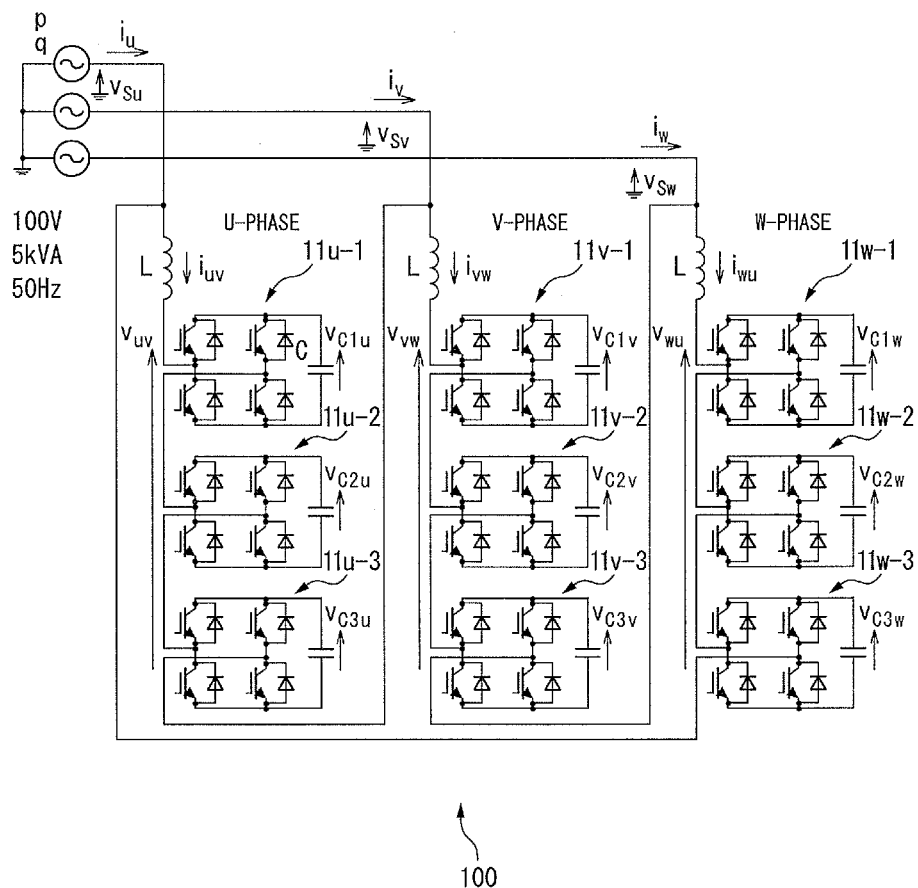
FIG. 12 is a circuit diagram of a power converter of a modular multilevel cascade type based on single-delta bridge-cells.
Figure 13:
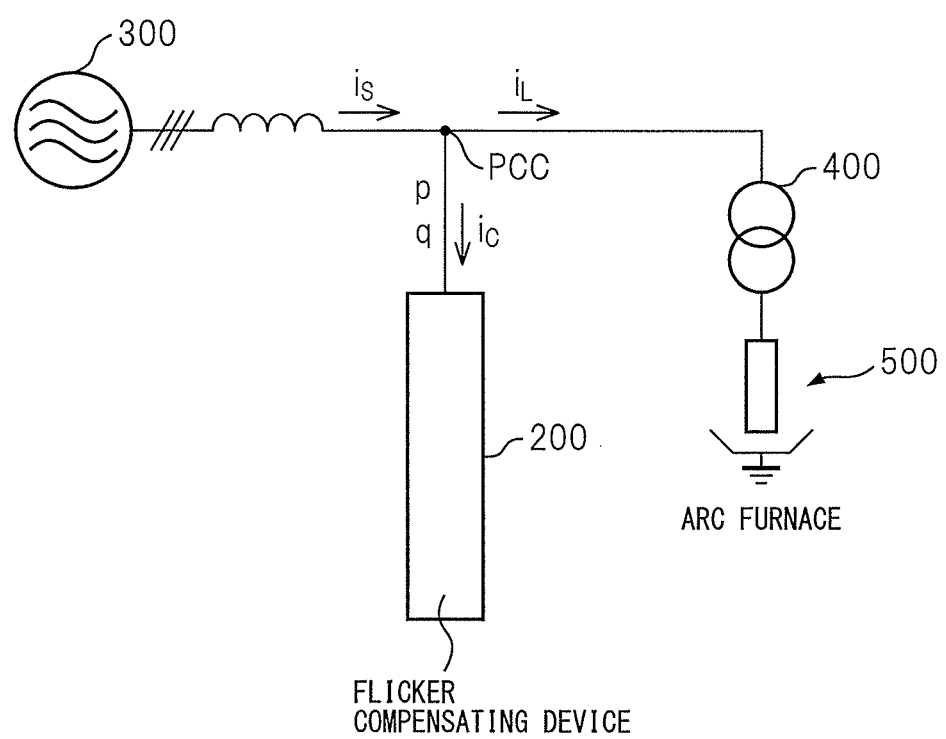
FIG. 13 illustrates a general configuration of a flicker compensating device.
Figure 14:
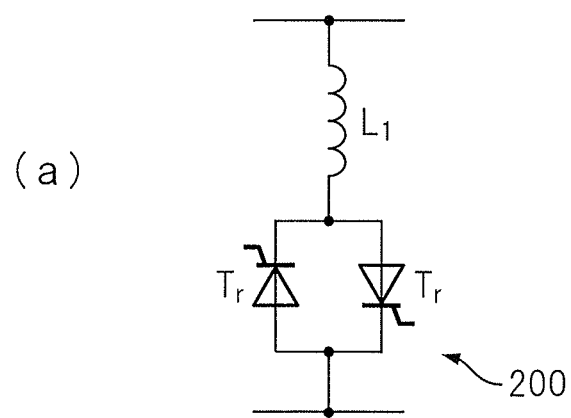
FIG. 14 is a circuit diagram illustrating a flicker compensating device using an SVC.
Figure 14:
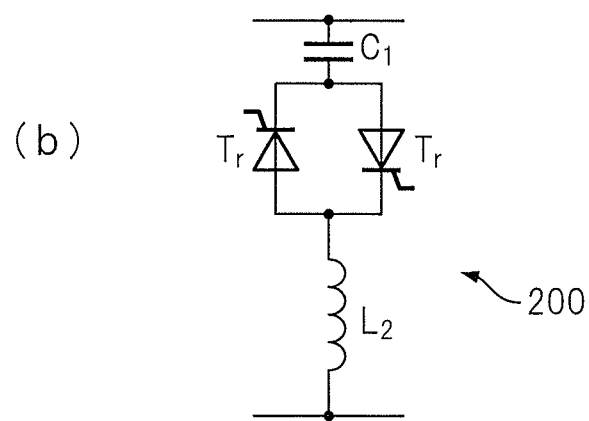

FIG. 1 is a circuit diagram of a modular multilevel cascade-type power converter based on single-delta bridge-cells according to an embodied example of the present invention. A circuit configuration of the modular multilevel cascade power converter 100 is the same as the circuit configuration illustrated in FIG. 12, except for an integrated control unit 1.

The modular multilevel cascade-type power converter 100 based on single-delta bridge-cells includes a delta connection unit 10 inside the power converter 100. Provided at each phase in the delta connection unit 10 is one bridge-cell or a plurality of bridge-cells connected in series to each other. In other words, one bridge-cell or a plurality of bridge-cells connected in series to each other are provided at each of the phases u, v, and w in the delta connection unit 10. In an example illustrated in FIG. 1, three bridge-cells $11u\text{-}j$, $11v\text{-}j$, and $11w\text{-}j$ (j=1 to 3) connected in series to each other are provided at each phase in the delta connection. In the following, the present embodied example of the present invention is described on the assumption that the number of the bridge-cells is three. However, the number of the bridge-cells provided at each phase in the delta connection unit 10 does not limit the present invention, and this number may be one, or plural number of bridge-cells connected in series to each other. In FIG. 1, the symbol L indicates a reactor component at each phase in the delta connection unit 10 of the power converter 100.

Each of the bridge-cells $11u\text{-}j$, $11v\text{-}j$, and $11w\text{-}j$ (j=1 to 3) includes a DC capacitor C, and two semiconductor switch groups that are arranged in parallel with the DC capacitor C. Each semiconductor switch group includes two semiconductor switches connected in series to each other. The semiconductor switch includes a semiconductor switching device that causes a current to flow in one direction through itself at the time of being turned on, and a feedback diode connected in antiparallel to the semiconductor switching device.

In FIG. 1, the symbols $V_{Su}$, $V_{Sv}$, and $V_{Sw}$ indicate phase voltages at respective phases of power supply voltages on the side of a system, the symbols $i_u$, $i_v$, and $i_w$ indicate power supply currents, and the symbols $i_{uv}$, $i_{vw}$, and $i_{wu}$ indicate converter currents flowing into the respective phases in the delta connection unit 10 of the power converter 100. Further, the symbols $v_{uv}$, $v_{vw}$, and $v_{wu}$ indicate output voltages of the respective phases in the delta connection unit 10 of the power converter 100, i.e., inter-line voltages of the output terminals of the power converter 100. The symbols $V_{Cju}$, $V_{Cjv}$, and $V_{Cjw}$ (j=1 to 3) indicate voltages of the DC capacitors in each of the bridge-cells $11u\text{-}j$, $11v\text{-}j$, and $11w\text{-}j$.

The integrated control unit 1 performs arithmetic operation to generate switching signals used for controlling switching operation of the semiconductor switches in each of the bridge-cells $11u\text{-}j$, $11v\text{-}j$, and $11w\text{-}j$ in the power converter 100. The integrated control unit 1 is configured by an arithmetic processing device such as a digital signal processor (DSP) or a field programmable gate array (FPGA). The converter currents $i_{uv}$, $i_{vw}$, and $i_{wu}$ flowing into the respective phases in the delta connection unit 10 of the power converter 100, the voltages $v_{Cju}$, $v_{Cjv}$, and $v_{Cjw}$ of the DC capacitors in each of the bridge-cells $11u\text{-}j$, $11v\text{-}j$, and $11w\text{-}j$, and the output voltages $v_{uv}$, $v_{vw}$, and $v_{wu}$ of the respective phases in the delta connection unit 10 of the power converter 100, i.e., inter-line voltages of the output terminals of the power converter 100 are detected by widely known detectors, and are input to the integrated control unit 1 to be processed by arithmetic operation in the integrated control unit 1.

Between the power supply currents $i_u$, $i_v$, and $i_w$, and the converter currents $i_{uv}$, $i_{vw}$, and $i_{wu}$, the following Formulae 1 to 3 are established.

[Formula 1]

$$i_u = i_{uv} - i_{wu} \quad (1)$$

[Formula 2]

$$i_v = i_{vw} - i_{uv} \quad (2)$$

[Formula 3]

$$i_v = i_{vu} - i_{vw} \quad (3)$$

In this case, a current $i_z$ (referred to as "circulating current" in the following) that circulates in the delta connection unit 10 is expressed by the Formula 4.

[Formula 4]

$$i_Z = \frac{1}{3}(i_{uv} + i_{vw} + i_{wu}) \quad (4)$$

As described above, the power converter 100 based on single-delta bridge-cells (MMCC-SDBC) controls a circulating current $i_z$ flowing in the delta connection line, and thereby allowing an adjustment of a negative-sequence reactive power. According to the embodied example of the present invention, the circulating current $i_z$ is further used in controlling for stably maintaining a voltage of the DC capacitor in each of chopper cells.

Figure 2:
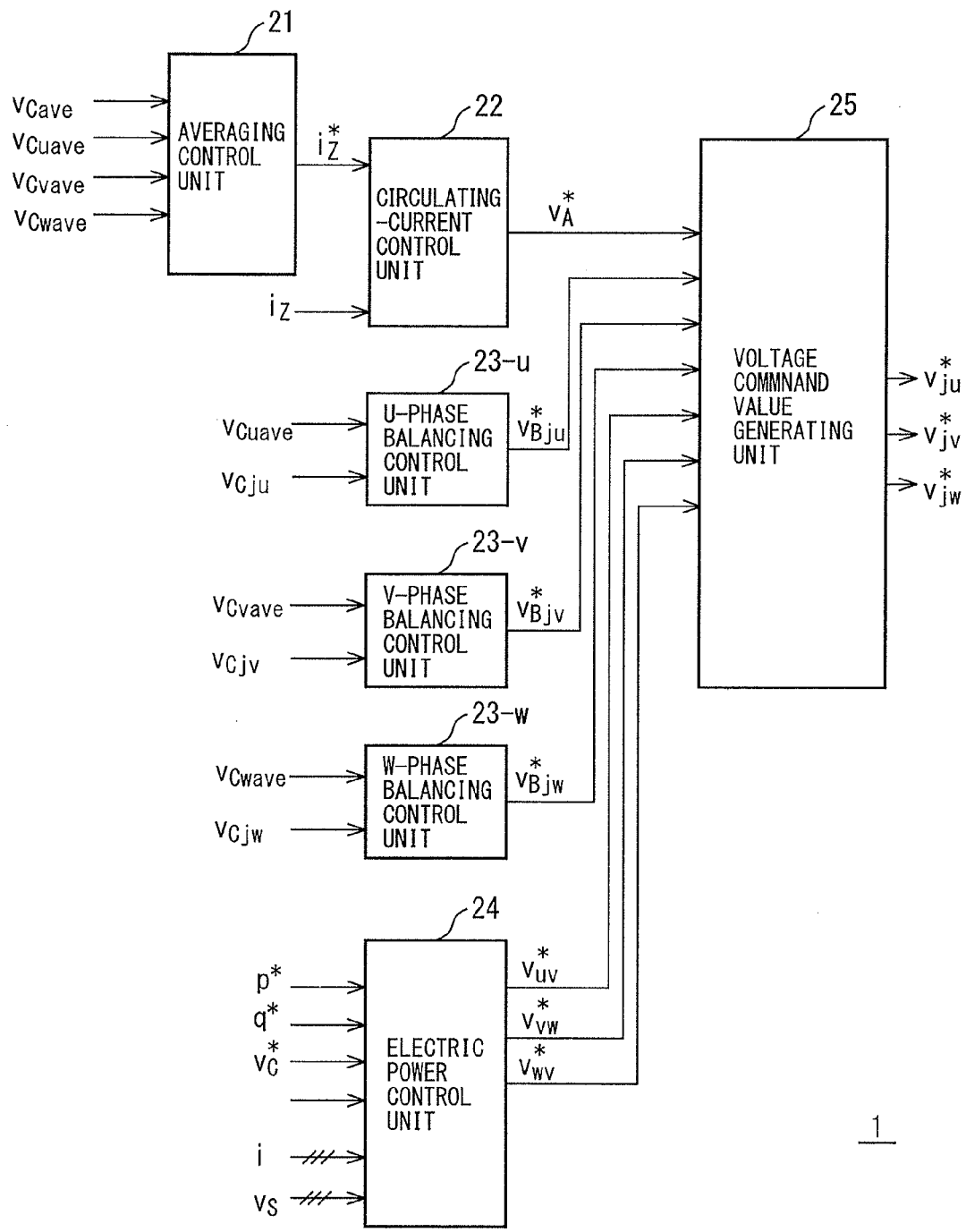
FIG. 2 is a block diagram of an integrated control unit of the power converter according to an embodied example of the present invention.

FIG. 2 is a block diagram of the integrated control unit of the power converter according to an embodied example of the present invention. The integrated control unit 1 of the power converter 100 according to the embodied example of the present invention includes an averaging control unit 21, a circulating-current control unit 22, a u-phase balancing control unit $23\text{-}u$, a v-phase balancing control unit $23\text{-}v$, a w-phase balancing control unit $23\text{-}w$, an electric power control unit 24, and a voltage command value generating unit 25. For example, the integrated control unit 1 is configured by an arithmetic processing device such as a DSP or an FPGA. The number of the bridge-cells in the present embodied example is set to three as one example, so that the symbol j takes values 1 to 3 in FIG. 2.

The averaging control unit 21 and the circulating-current control unit 22 control the circulating current $i_z$ flowing in the delta connection unit 10 such that each of DC-capacitor by-phase average values $v_{Cuave}$, $v_{Cvave}$, and $v_{Cwave}$ follows a DC-capacitor three-phase average value $v_{Cave}$. Each of the by-phase average values $v_{Cuave}$, $v_{Cvave}$, and $v_{Cwave}$ are obtained by averaging voltages of the DC capacitors at the corresponding phase of the u-phase, the v-phase, and the w-phase. The three-phase average value $v_{Cave}$ are obtained by averaging voltages of the DC capacitors at all of the three phases.

Figure 3:
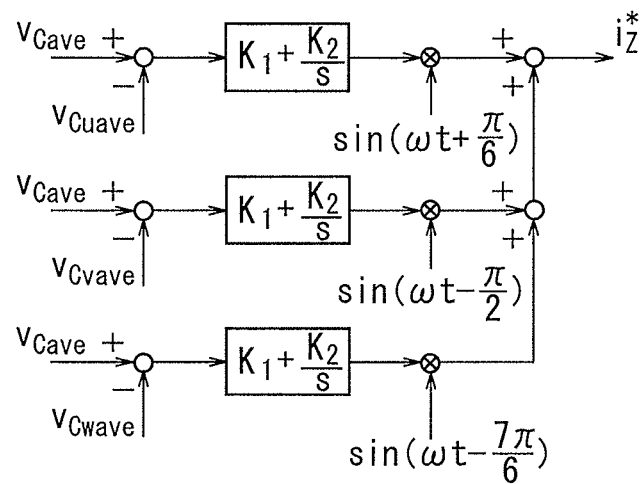
FIG. 3 is a block diagram of an averaging control unit of the power converter according to an embodied example of the present invention.

FIG. 3 is a block diagram of the averaging control unit of the power converter according to an embodied example of the present invention. The Formulae 5 to 7 represent the DC-capacitor by-phase average values $v_{Cuave}$, $v_{Cvave}$, and $v_{Cwave}$ each of which is obtained by averaging voltages of the DC capacitors at the corresponding phase of the u-phase, the v-phase, and the w-phase.

[Formula 5]

$$v_{Cuave} = \frac{1}{3}\sum_{j=1}^{3} v_{Cju} \quad (5)$$

[Formula 6]

$$v_{Cvave} = \frac{1}{3}\sum_{j=1}^{3} v_{Cjv} \quad (6)$$

[Formula 7]

$$v_{Cwave} = \frac{1}{3}\sum_{j=1}^{3} v_{Cjw} \quad (7)$$

When only one bridge-cell $11u\text{-}1$, $11v\text{-}1$, or $11w\text{-}1$ is provided at the corresponding phase of the u-phase, the v-phase, or the w-phase, voltage $V_{C1u}$, $V_{C1v}$, or $V_{C1w}$ at the bridge-cell $11u\text{-}1$, $11v\text{-}1$, or $11w\text{-}1$ correspond to the DC-capacitor by-phase average value $v_{Cuave}$, $v_{Cvave}$, or $v_{Cwave}$.

The Formula 8 represents the DC-capacitor three-phase average value $v_{Cave}$ obtained by averaging voltages of the DC capacitors at all of the three phases.

[Formula 8]

$$v_{Cave} = \frac{v_{Cuave} + v_{Cvave} + v_{Cwave}}{3} \quad (8)$$

The averaging control unit 21 generates a circulating-current command value $i_z^*$ on the basis of the DC-capacitor three-phase average value $v_{Cave}$, and each of the DC-capacitor by-phase average values $v_{Cuave}$, and $v_{Cwave}$, in order to form a feedback loop in which each of the DC-capacitor by-phase average values $v_{Cuave}$, $v_{Cvave}$, and $v_{Cwave}$ is made to follow the DC-capacitor three-phase average value $v_{Cave}$. Specifically, the averaging control unit 21 sums up a first value, a second value, and a third value to thereby generate the circulating-current command value $i_z^*$. The first value is obtained by multiplying a difference between the DC-capacitor three-phase average value $v_{Cave}$ and the DC-capacitor by-phase average value $v_{Cuave}$ for the u-phase by a gain ($K_1 + K_2/K_2/s$), and then giving a phase amount to the multiplied difference. The second value is obtained by multiplying a difference between the DC-capacitor three-phase average value $v_{Cave}$ and the DC-capacitor by-phase average value $v_{Cvave}$ for the v-phase by the gain ($K_1 + K_2/s$), and then giving a phase amount to the multiplied difference. The third value is obtained by multiplying a difference between the DC-capacitor three-phase average value $v_{Cave}$ and the DC-capacitor by-phase average value $v_{Cwave}$ for the w-phase by the gain $(K_1+K_2/s)$, and then giving a phase amount to the multiplied difference. The DC-capacitor three-phase average value $v_{Cave}$, and the DC-capacitor by-phase average values $v_{Cuave}$, $v_{Cvave}$, and $v_{Cwave}$ that are calculated in accordance with the Formulae 5 to 8 actually include alternating current (AC) components in addition to DC components. The AC components become disturbance for the control system. For this reason, in arithmetic operation by the averaging control unit 21 illustrated in FIG. 3, the only DC component extracted from each of the calculated average values is used. As a method for extracting the DC component, a widely known method may be used. For example, there are a method using a low-pass filter, a method using a theory approximation formula, and a method using moving average (100 Hz).

The above-mentioned phase amounts given in the respective phases in the arithmetic operation by the averaging control unit 21 are based on a reference set as "sin $\omega t$" that is a phase component of a phase voltage at the u-phase on the side of the power supply. Accordingly, the phase component "sin $(\omega t+\pi/6)$" represents an in-phase component with the inter-line voltage $v_{uv}$ between the output terminal at the u-phase and the output terminal at the v-phase of the power converter 100. An effect for the power converter by the averaging control unit 21 according to active-voltage outflow and inflow is now described for the u-phase, for example. When the DC-capacitor three-phase average value $v_{Cave}$ is larger than the DC-capacitor by-phase average value $v_{Cuave}$ for the u-phase, the circulating current $i_z$ includes an in-phase component with the inter-line voltage $v_{uv}$ between the u-phase and the v-phase, so that the inter-line voltage $v_{uv}$ and the circulating current $i_z$ form a positive active power. The relation "$i_z=i_z*$" is satisfied on the assumption that the present control causes the current $i_z$ to follow the circulating-current command value $i_z*$. As a result, the positive active power flows into the u-phase of the power converter 100 so that the voltage of the DC-capacitor by-phase average value $v_{Cuave}$ for the u-phase increases. On the other hand, when the DC-capacitor three-phase average value $v_{Cave}$ is smaller than the DC-capacitor by-phase average value $v_{Cuave}$ for the u-phase, the circulating current $i_z$ includes an antiphase component to the inter-line voltage $v_{uv}$ between the u-phase and the v-phase, so that the inter-line voltage $v_{uv}$ and the circulating current $i_z$ form a negative active power. As a result, the negative active power flows into the u-phase of the power converter 100 (i.e., positive active power flows out from the u-phase of the power converter 100) so that the voltage of the DC-capacitor by-phase average value $v_{Cuave}$ for the u-phase decreases.

Figure 4:
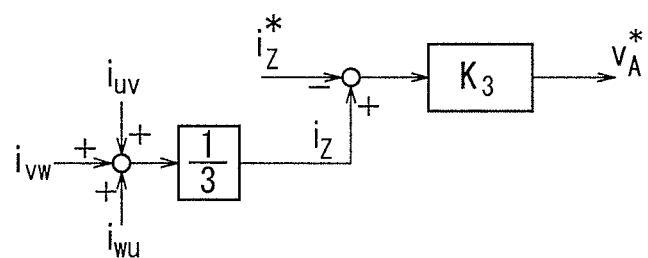
FIG. 4 is a block diagram of a circulating-current control unit of the power converter according to an embodied example of the present invention.

FIG. 4 is a block diagram of the circulating-current control unit of the power converter according to an embodied example of the present invention. The circulating current $i_z$ is calculated by the Formula 4. The circulating-current control unit 22 forms a feedback loop for causing the circulating current $i_z$ to follow the circulating-current command value $i_z*$. In other words, the circulating-current control unit 22 generates a first command value $v_A*$ common to the respective phases for controlling switching operation of the semiconductor switches such that the circulating current $i_z$ follows the circulating-current command value $i_z*$ generated by the averaging control unit 21.

Figure 5:
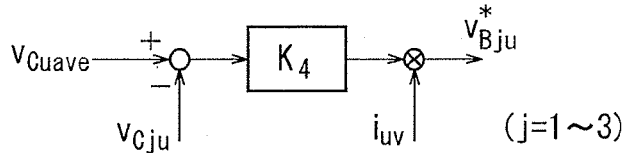
FIG. 5A is a block diagram of a u-phase balancing control unit of the power converter according to an embodied example of the present invention.
FIG. 5B is a block diagram of a v-phase balancing control unit of the power converter according to an embodied example of the present invention.
FIG. 5C is a block diagram of a w-phase balancing control unit of the power converter according to an embodied example of the present invention.
Figure 5:
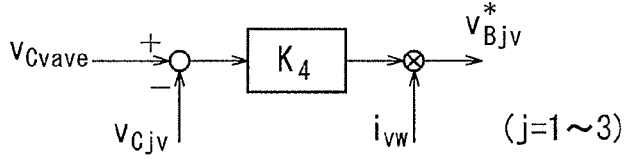
Figure 5:
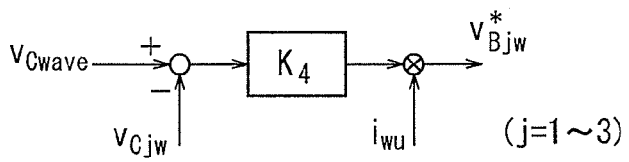

FIG. 5A, FIG. 5B, and FIG. 5C are block diagrams of the balancing control units of the power converter according to an embodied example of the present invention. FIG. 5A is a block diagram of the u-phase balancing control unit, FIG. 5B is a block diagram of the v-phase balancing control unit, and FIG. 5C is a block diagram of the w-phase balancing control unit. The balancing control is performed at each phase, and is performed at each bridge-cell within respective phases. In the present embodied example, it is assumed that the number of the bridge-cells is set to three as one example, so that the symbol j takes values 1 to 3 in FIG. 5.

As expressed in FIG. 5A to FIG. 5C, and in the Formulae 9 to 11, the u-phase balancing control unit 23-u, the v-phase balancing unit 23-v, and the w-phase balancing unit 23-w form active power between the output voltages $v_{Cju}$, $v_{Cjv}$, and $v_{Cjw}$ of the respective bridge-cells 11u-j, 11v-j, and 11w-j (j=1 to 3) of the power converter 100, and the converter currents $i_{uv}$, $i_{vw}$, and $i_{wu}$ respectively flowing into the u-phase, the v-phase, and the w-phase in the delta connection unit 10, to accomplish voltage balance.

[Formula 9]

$$v'_{Bju}=K_4(v_{Cuave}-v_{Cju})i_{uv} \qquad (9)$$

where j=1 to 3

[Formula 10]

$$v'_{Bjv}=K_4(v_{Cvave}-v_{Cjv})i_{vw} \qquad (10)$$

where j=1 to 3

[Formula 11]

$$v'_{Bjw}=K_4(v_{Cwave}-v_{Cjw})i_{wu} \qquad (11)$$

where j=1 to 3

In other words, the u-phase balancing control unit 23-u, the v-phase balancing control unit 23-v, and the w-phase balancing control unit 23-w generate second command values $v_{Bju}*$, $v_{Bjv}*$, and $v_{Bjw}*$ for controlling switching operation of the semiconductor switches in the bridge-cells of the respective phases. The second command value $v_{Bju}*$, $v_{Bjv}*$, or $v_{Bjw\ v}*$ is generated for each bridge-cell 11u-j, 11v-j, or 11w-j of the corresponding phase, by using a value that is obtained by multiplying a difference between the DC-capacitor by-phase average value for the corresponding phase and a voltage value of the DC capacitor in the corresponding bridge-cell by a value of an AC current flowing into the corresponding phase. Specifically, as expressed in FIG. 5A and in the Formula 9, the u-phase balancing control unit 23-u generates the second command value $v_{Bju}*$ for the u-phase by multiplying a difference between the DC-capacitor by-phase average value $v_{Cuave}$ for the u-phase and a voltage value $v_{Cju}$ of the DC capacitor in the bridge-cell 11u-j by a value of an AC current $i_{uv}$, flowing into the u-phase of the power converter 100, and by further multiplying the multiplied value by a gain $K_4$. As expressed in FIG. 5B and in the Formula 10, the v-phase balancing control unit 23-v generates the second command value $v_{Bjv}*$ for the v-phase by multiplying a difference between the DC-capacitor by-phase average value $v_{Cvave}$ for the v-phase and a voltage value $v_{Cjv}$ of the DC capacitor in the bridge-cell 11v-j by a value of an AC current $i_{vw}$ flowing into the v-phase in the power converter 100, and by further multiplying the multiplied value by the gain $K_4$. As expressed in FIG. 5C and in the Formula 11, the w-phase balancing control unit 23-w generates the second command value $v_{Bjw}*$ for the w-phase by multiplying a difference between the DC-capacitor by-phase average value $v_{Cwave}$ for the w-phase and a voltage value $v_{Cjw}$ of the DC capacitor in the bridge-cell 11w-j by a value of an AC current $i_{wu}$ flowing into the w-phase in the power converter 100, and by further multiplying the multiplied value by the gain $K_4$.

Figure 6:
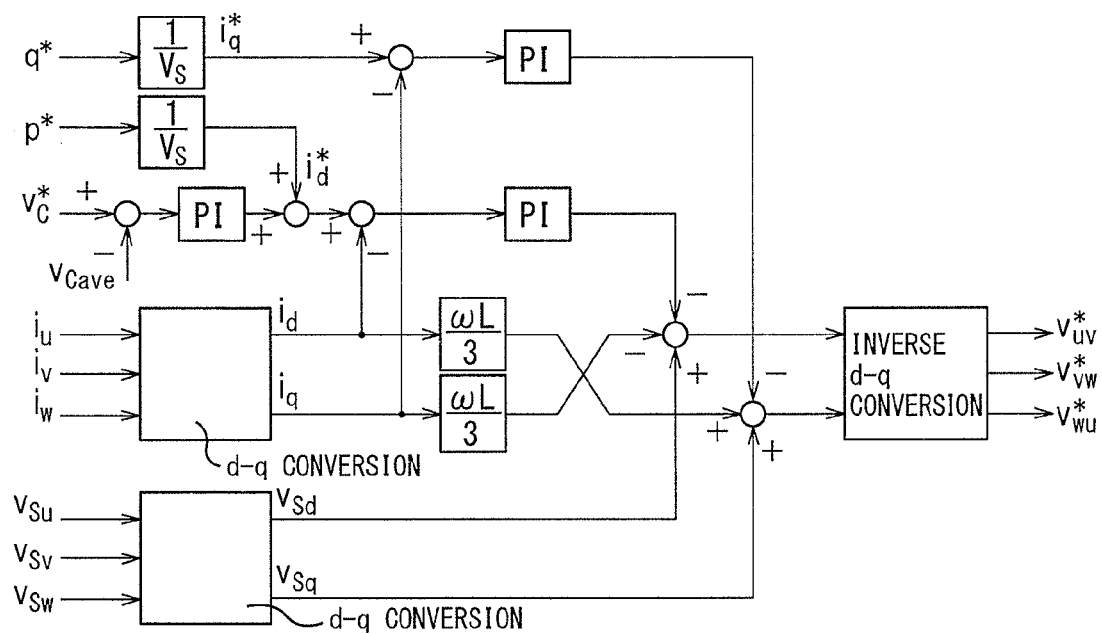
FIG. 6 is a block diagram of an electric power control unit of the power converter according to an embodied example of the present invention.

FIG. 6 is a block diagram of the electric power control unit of the power converter according to an embodiment of the present invention. The electric power control unit 24 generates third command values $v_{uv}^*$, $v_{vw}^*$, and $v_{wu}^*$ that are inter-line voltage command values for performing at least one of positive-sequence reactive power control, negative-sequence reactive power control, and active power control. The block diagram illustrated in FIG. 6 is a general control block for the positive-sequence reactive power control, the negative-sequence reactive power control, and the active power control of a static synchronous compensator (STATCOM). In FIG. 6, the symbol p* indicates a power-supply-side instant active power command value, and the symbol q* indicates a power-supply-side instant reactive power command value. A feedback loop for causing the DC-capacitor three-phase average value $v_{Cave}$ to follow a voltage command value $v_C^*$ of the DC-capacitor is formed, and a current is made to follow a d-axis current command value $i_d^*$.

When the positive-sequence reactive power control is performed, the value of zero "0" is given to the power-supply-side instant active power command value p* of the electric power control unit 24, and a DC component is given to the power-supply-side instant reactive power command value q*. When the negative-sequence reactive power control is performed, second-order components (phase difference of 90 degrees) are given to the power-supply-side instant active power command value p* and the power-supply-side instant reactive power command value q* of the electric power control unit 24. When the active power control is performed, the value of zero "0" is given to the power-supply-side instant reactive power command value q* of the electric power control unit 24, and a low-frequency component is given to the power-supply-side instant active power command value p*. The electric power control unit 24 appropriately combines these types of the control and performs the combined types of the control. The third command values $v_{uv}^*$, $v_{vw}^*$, and $v_{wu}^*$ that are inter-line voltage command values are determined by non-interacting control of a current of the power supply.

The first command value $v_A^*$ generated by the averaging control unit 21 and the circulating-current control unit 22, the second command values $v_{Bju}^*$, $v_{Bjv}^*$, and $v_{Bjw}^*$ generated by the u-phase balancing control unit 23-u, the v-phase balancing control unit 23-v, and the w-phase balancing control unit 23-w, and the third command values $v_{uv}^*$, $v_{vw}^*$, and $v_{wu}^*$ generated by the electric power control unit 24 are input to the voltage command value generating unit 25.

Figure 7:
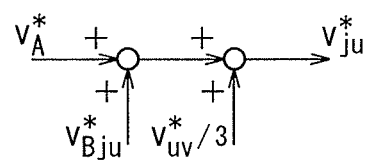
FIG. 7A is a block diagram of a voltage command value generating unit of the power converter according to an embodied example of the present invention, and illustrates generation of a voltage command value for the u-phase.
FIG. 7B is a block diagram of a voltage command value generating unit of the power converter according to an embodied example of the present invention, and illustrates generation of a voltage command value for the v-phase.
FIG. 7C is a block diagram of a voltage command value generating unit of the power converter according to an embodied example of the present invention, and illustrates generation of a voltage command value for the w-phase.
Figure 7:
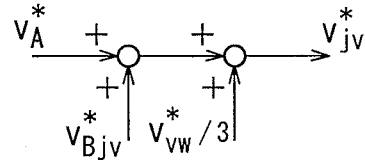
Figure 7:
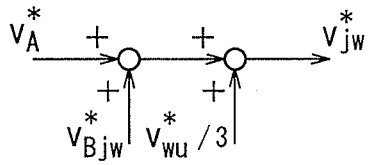

FIG. 7A, FIG. 7B, and FIG. 7C are block diagrams of the voltage command value generating unit of the power converter according to an embodied example of the present invention. FIG. 7A is a block diagram illustrating generation of a voltage command value for the u-phase, and FIG. 7B is a block diagram illustrating generation of a voltage command value for the v-phase, and FIG. 7C is a block diagram illustrating generation of a voltage command value for the w-phase. In the embodied example of the present invention, the number of the bridge-cells is set to three as one example, so that the symbol j takes values 1 to 3 in FIG. 7.

The voltage command value generating unit 25 functions as a switching command value generating unit for generating a switching command value that controls switching operation of the semiconductor switches in each bridge-cells 11u-j, 11v-j, and 11w-j of the power converter 100. As illustrated in FIG. 7A, the voltage command value generating unit 25 generates the voltage command value $v_{ju}^*$ for each bridge-cell 11u-j of the u-phase by summing up the first command value $v_A^*$, the second command value $v_{Bju}^*$, and the value that is obtained by dividing the third command value $v_{uv}^*$ by the number of the bridge-cells (three in the embodied example of the present invention). As illustrated in FIG. 7B, the voltage command value generating unit 25 generates the voltage command value $v_{jv}^*$ for each bridge-cell 11v-j of the v-phase by summing up the first command value $v_A^*$, the second command value $v_{Bjv}^*$, and the value that is obtained by dividing the third command value $v_{vw}^*$ by three. As illustrated in FIG. 7C, the voltage command value generating unit 25 generates the voltage command value $v_{jw}^*$ for each bridge-cell 11w-j of the w-phase by summing up the first command value $v_A^*$, the second command value $v_{Bjw}^*$, and the value that is obtained by dividing the third command value $v_{wu}^*$ by three.

The generated voltage command values $v_{ju}^*$, $v_{jv}^*$ and $v_{jw}^*$ are normalized by voltages $v_C$ of the respective DC capacitors to be used as the switching command values. The switching command value is compared with a triangular wave carrier signal (maximum value: 1, and minimum value: −1) of a carrier frequency $f_c$ by switching control means, not illustrated, to generate a PWM switching signal. The generation of the PWM switching signal is accomplished by using an arithmetic processing device such as a DSP or an FPGA. The generated PWM switching signal is used for switching control of the semiconductor switch in the corresponding bridge-cell 11-j.

Next, the experimental result of the power converter 100 according to the embodied example of the present invention is described. In the experiment, the power converter 100 was assumed to be used as a static synchronous compensator, and the AC power supply imitating the electric power system had a phase voltage of 100V, a capacitance of 5 kVA, and frequency of 50 Hz. Table 1 indicates circuit parameters used in the experiment.

TABLE 1

Circuit Parameters

| Rated capacity | | 5 kVA |
| --- | --- | --- |
| Inter-line voltage effective value | Vs | 100 V |
| Power supply frequency | Fs | 50 Hz |
| Power supply current | I | 29 A |
| Converter current | I/root 3 | 17 A |
| Capacity of DC capacitor of bridge-cell | C | 16.4 mF/900 mF |
| DC capacitor voltage | Vc | 60 V |
| Unit capacitance constant | H | 53 ms/2.9 s |
| Carrier frequency | Fc | 2 kHz |
| Equivalent switching frequency | 6 fc | 12 kHz |
| AC-link inductor | L | 1.2 mH (6%) |

100 V, 17 A, 50 Hz base

In the experiment, the waveform was measured by the PC-based measuring device "WE7000", made by Yokogawa Electric Corporation. The sampling speed was set as 100 kS/s in FIG. 8 to FIG. 10, and set as 20 kS/s in FIG. 11.

Figure 8:
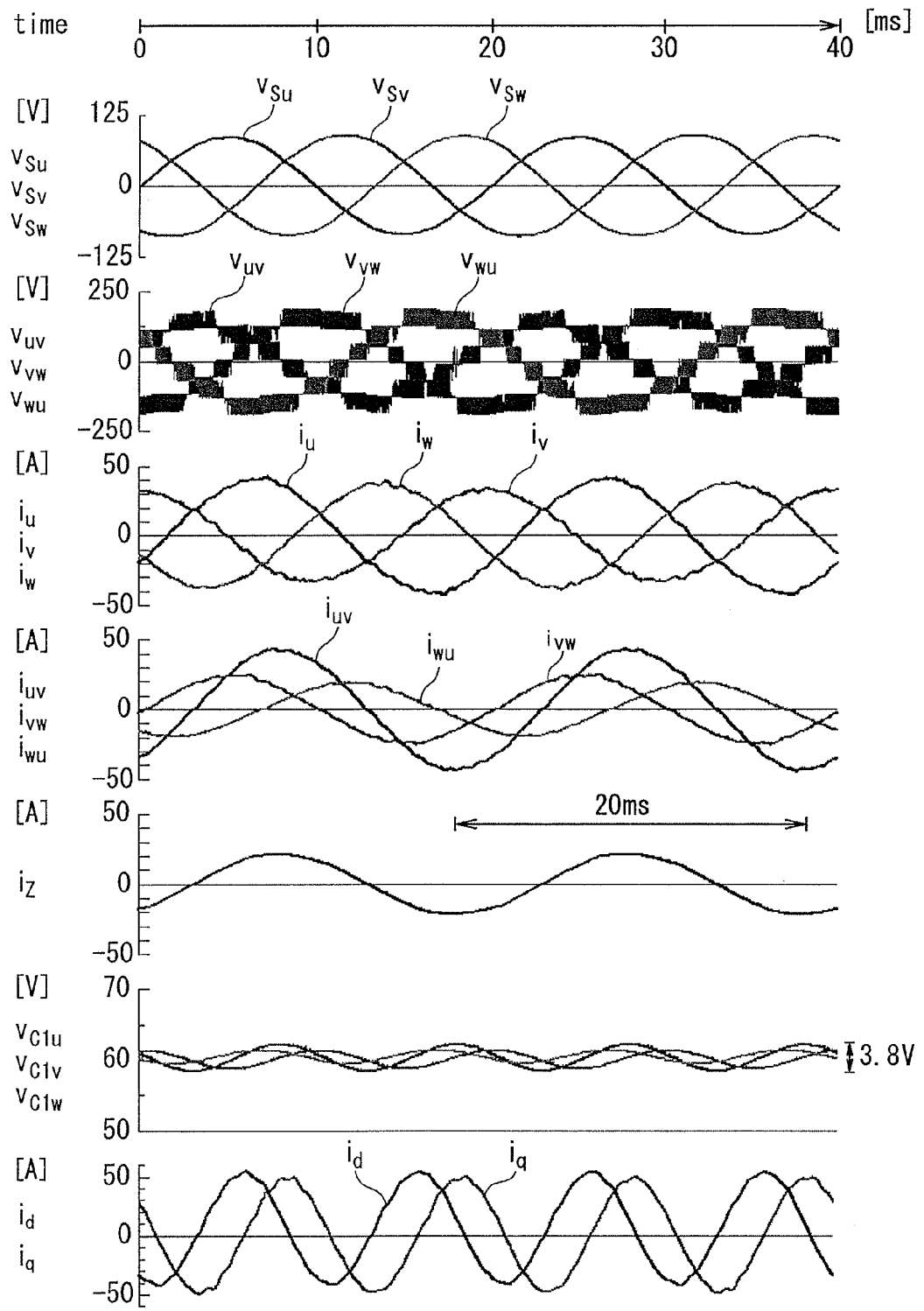
FIG. 8 illustrates the waveforms in an experiment when a negative-sequence reactive power control was performed in the power converter according to the embodied example of the present invention.

FIG. 8 illustrates the waveforms in the experiment when the negative-sequence reactive power control was performed in the power converter according to the embodied example of the present invention. In the experiment, the capacitance C of the DC-capacitor voltage in each bridge-cell was set as the value of 16.4 mF, the unit electrostatic constant of the converter was set as the value of 53 ms, and the operation was performed so as to compensate the rated negative-sequence reactive power of 5 kVA. It was understood that the negative-sequence reactive current $i_u$, $i_w$, and $i_v$ (or $i_{uv}$, $i_{wu}$, and $i_{vw}$) flow in response to the power-supply voltage $V_{Su}$, $V_{Sv}$, and $V_{Sw}$.

Figure 9:
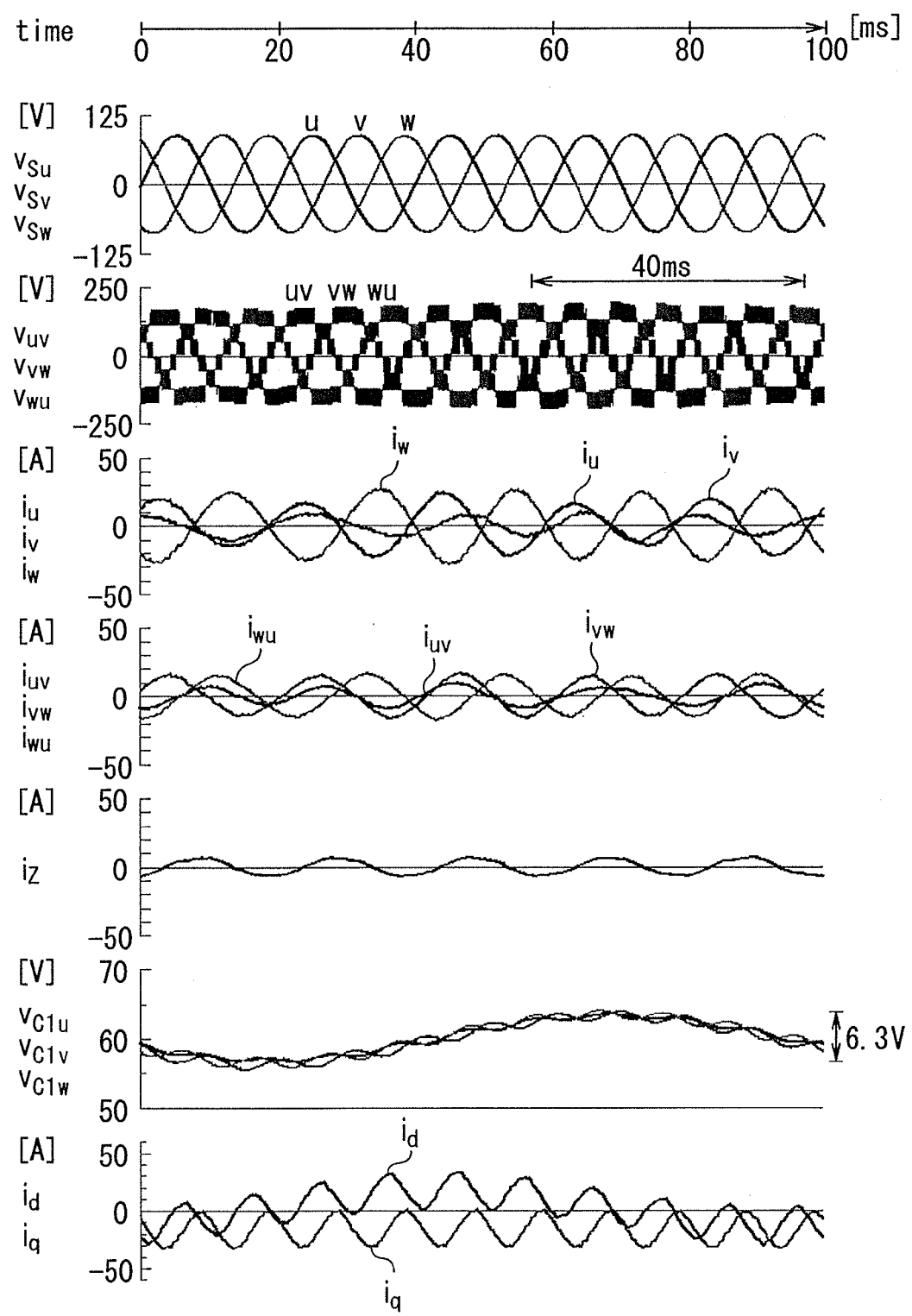
FIG. 9 illustrates the waveforms in an experiment when a positive-phase reactive power control, the negative-sequence reactive power control, and an active power control were simultaneously performed in the power converter according to the embodied example of the present invention.

FIG. 9 illustrates the waveforms in the experiment when the positive-sequence reactive power control, the negative-sequence reactive power control, and the active power control were simultaneously performed in the power converter according to the embodied example of the present invention. In the experiment, it is assumed that the electric power converter 100 was made to function as a flicker compensating device. The capacitance C of the DC-capacitor voltage in each bridge-cell was set as the value of 16.4 mF, and the unit capacitance constant of the converter was set as the value of 53 ms. The operation was performed so as to compensate the positive-sequence reactive power of 1.7 kVA, and the negative-sequence reactive power of 1.7 kVA, and the active electric power was controlled so as to have the frequency of 10 Hz and the electric power value of 1.7 kVA. It can be understood from FIG. 9 that the voltages $v_{C1u}$, $v_{C1v}$, and $v_{C1w}$ of the DC capacitors at the respective u-phase, v-phase, and w-phase are maintained to be stable. In addition, it can be understood that the d-axis current $i_d$ includes a 100 Hz-component (i.e., twice the power-supply frequency) and the 10 Hz-component, and the q-axis current $i_d$ includes a DC component and a 100 Hz component.

Figure 10:
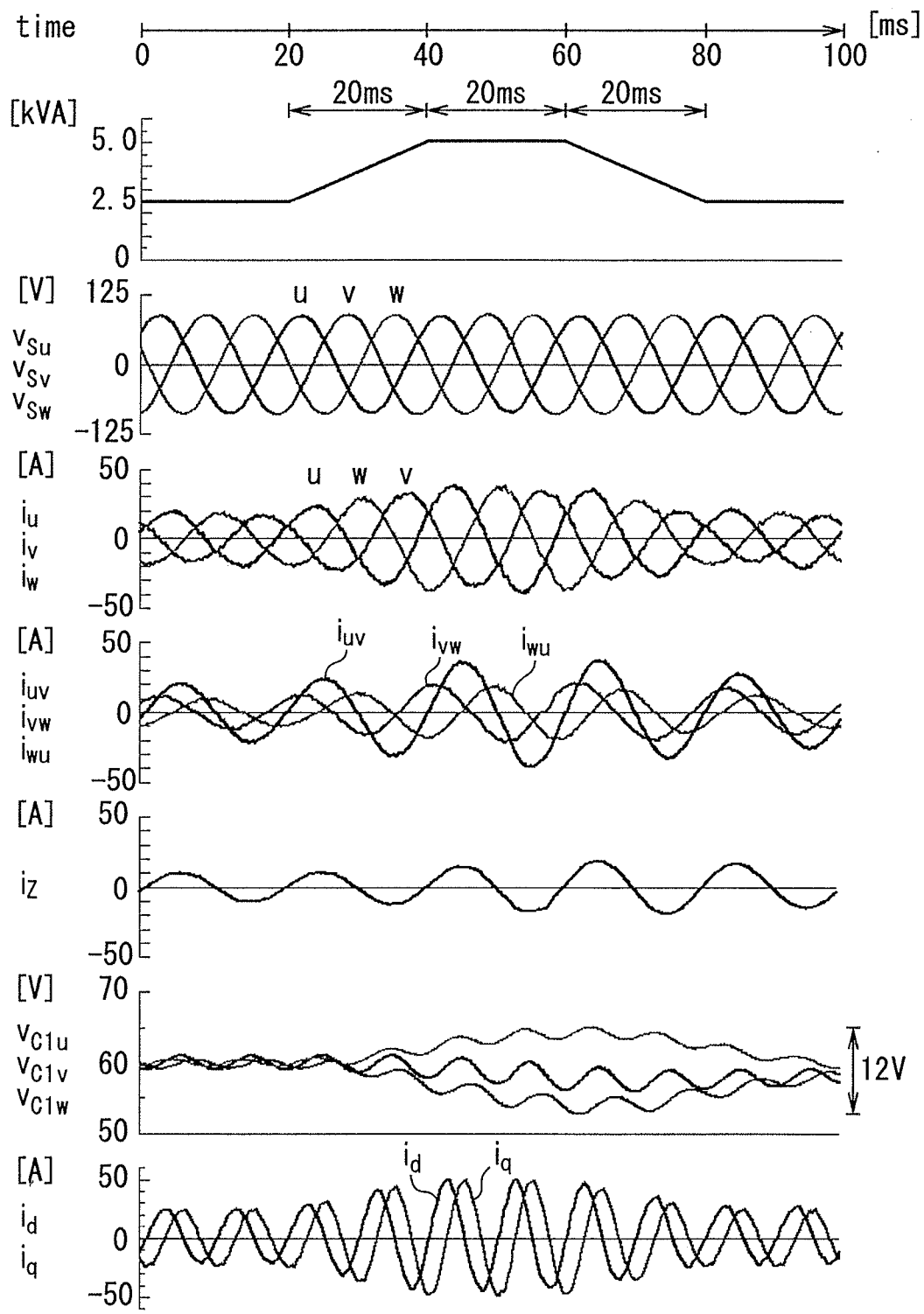
FIG. 10 illustrates the waveforms in the experiment about the transitional characteristic at the time of the negative-sequence reactive power control, in the power converter according to an embodied example of the present invention.

FIG. 10 illustrates the waveforms in the experiment about the transitional characteristic at the time of the negative-sequence reactive power control, in the power converter according to an embodied example of the present invention. In the experiment, the capacitance C of the DC-capacitor voltage in each bridge-cell was set as the value of 16.4 mF, and the unit capacitance constant of the converter was set as the value of 53 ms. Further, in the experiment, the reactive power command value was increased from 2.5 kVA to 5 kVA (i.e., from 50% to 100% of the rated value) in the shape of the ramp function (2.5 kVA/20 ms), and after time of 20 ms, the reactive power command value was decreased from 5 kVA to 2.5 kVA in the shape of the ramp function (−2.5 kVA/20 ms). It can be understood that although the voltages $v_{C1u}$, $v_{C1v}$, and $v_{C1w}$ of the DC capacitors at the respective u-phase, v-phase, and w-phase slightly fluctuate at the time of the transition, these voltages were able to be stably maintained over time. In addition, it can be understood that the negative-sequence reactive currents $i_u$, $i_w$, and $i_v$ (or $i_{uv}$, $i_{wu}$, and $i_{vw}$) were able to be controlled as well.

Figure 11:
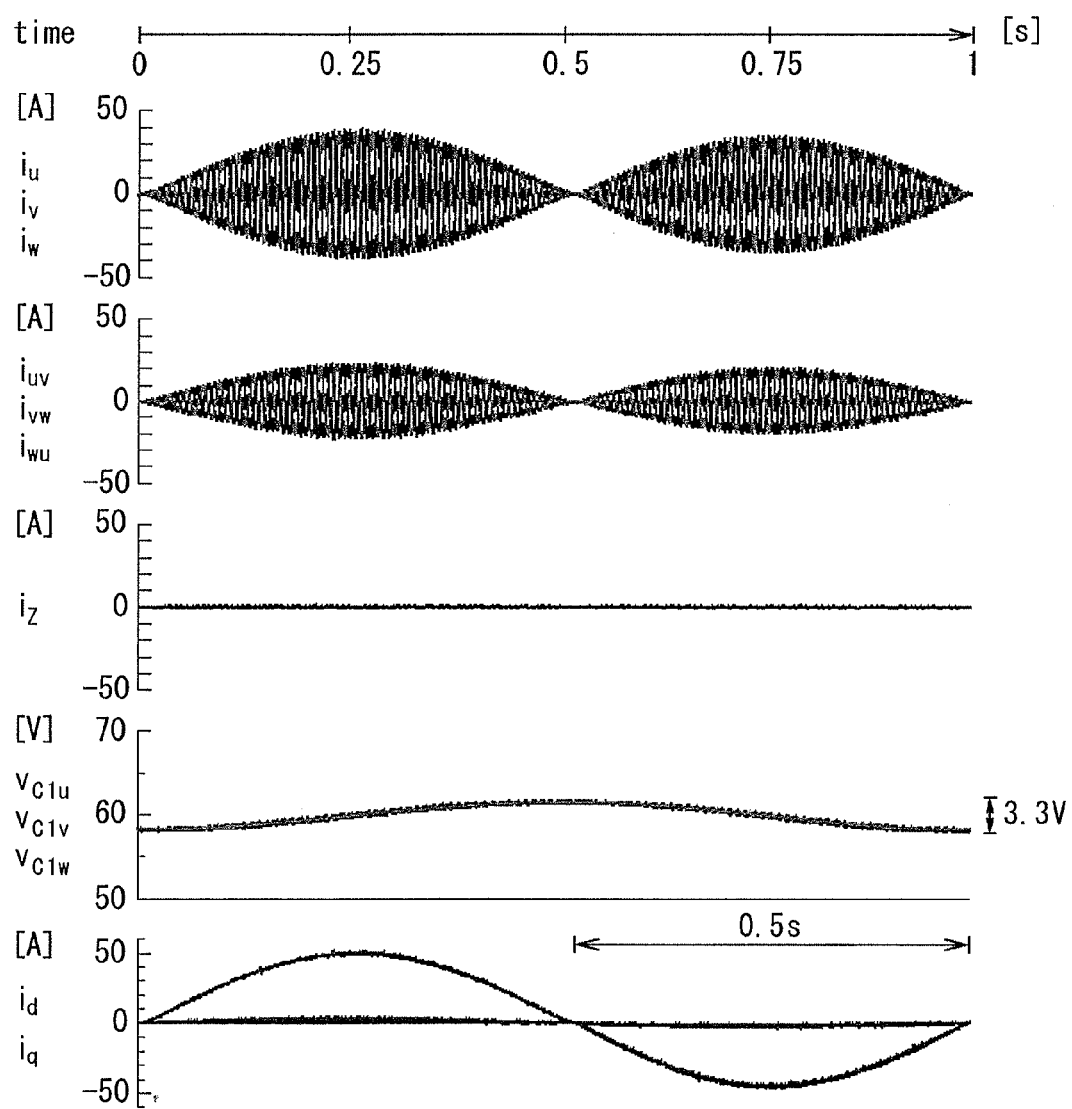
FIG. 11 illustrates the waveforms in the experiment in a low-frequency active power control in the power converter according to an embodied example of the present invention.

FIG. 11 illustrates the waveforms in the experiment in the low-frequency active power control in the power converter according to an embodied example of the present invention. In the experiment, the capacitance C of the DC-capacitor voltage in each bridge-cell was set as the value of 0.9 F, and the unit capacitance constant of the converter was set as the value of 2.9 ms. The active power was controlled so as to have the frequency of 1 Hz, and the electric power value of 5 kVA. In the present experiment, the reactive power was not compensated. Accordingly, as illustrated in FIG. 11, the circulating current $i_z$ did not flow. It can be understood that even under such a condition, the voltages $v_{C1u}$, $v_{C1v}$, and $v_{C1w}$ of the DC capacitors at the respective u-phase, v-phase, and w-phase were able to be stably maintained though these voltages slightly fluctuate at the time of the transition.

Thus, the waveforms in the experiment represented in FIG. 8 to FIG. 11 indicate that in the modular multilevel cascade-type power converter based on single-delta bridge-cells, the present invention enables to maintain voltages of the DC capacitors to be stable in all of the operational modes while controlling the voltages of the DC capacitors when high-speed control of positive-sequence and negative-sequence reactive power, and control of low-frequency active power are being performed.

When such a modular multilevel cascade-type power converter based on single-delta bridge-cells according to the present invention is used in a flicker compensating device, more advantageous effect than in the prior art is obtained for a flicker compensating ratio. For example, it is assumed that each device used in the modular multilevel cascade-type power converter based on single-delta bridge-cells to which the present invention is applied has the same switching frequency and rated voltage as the device used in the single-phase bridge IEGT module that constitutes the flicker compensating device described in Non-Patent Literature 6, and the both of them have the same number of the devices. On this assumption, the single-phase bridge IEGT module corresponds to the above-described single-delta bridge-cells in the present invention, and the configurations thereof are the same. Accordingly, the flicker compensating device using the modular multilevel cascade-type power converter based on single-delta bridge-cells according to the present invention can achieve at least a flicker compensating ratio of 74% that is the comparable value obtained by the flicker compensating device described in Non-Patent Literature 6. When each semiconductor switching device used in the modular multilevel cascade-type power converter based on single-delta bridge-cells to which the present invention is applied is assumed to be an IGBT having a low voltage resistance (for example, an IGBT having a resistance voltage of 1.7 kV), a high switching frequency (for example, 2 kHz) can be set so that a flicker compensating ratio higher than the above-described value of 74% can be expected, though the number of the single-delta bridge-cells in the present invention is larger compared with the number of the single-phase bridge IEGT modules of Non-Patent Literature 6.

According to the present invention, a multi-winding coil transformer as provided in the flicker compensating device described in Non-Patent Literature 6 is not used. In other words, according to the present invention, the power converter can achieve high voltage and large capacity without using a multi-winding coil transformer. For this reason, the present invention is more advantageous than the flicker compensating device described in Non-Patent Literature 6 in that a weight, a volume, and a cost of the converter can be prevented from being largely increased even with high voltage and large capacity. Further, according to the present invention, a multi-winding coil transformer is not used, so that there is an advantage that it is relatively easy to change the number of the converters for each phase even when a design change is required.

The present invention can be applied to control of a modular multilevel cascade-type power converter based on single-delta bridge-cells. According to the modular multilevel cascade-type power converter based on single-delta bridge-cells to which the present invention has been applied, voltages of the DC capacitors can be stably maintained while high-speed control of positive-sequence and negative-sequence reactive power, and control of low-frequency active power are performed. For example, in the case of a voltage-flicker compensating device for an arc furnace, a large-capacity reactive power compensating device that can perform high-speed control of positive-sequence and negative-sequence reactive power, and control of low-frequency active power is used in order to suppress voltage drop and voltage fluctuation caused by the arc furnace. The modular multilevel cascade-type power converter based on single-delta bridge-cells according to the present invention is most suitable for such use.

The invention claimed is:
1. A power converter comprising:
 a DC capacitor;
 semiconductor switch groups, each of which includes two semiconductor switches connected in series to each other;

one or a plurality of bridge-cells, each of which includes the DC capacitor and the two semiconductor switches, which are connected in parallel to the DC capacitor;

a delta connection unit at which one or a plurality of bridge-cells are delta-connected, each of the bridge-cells being connected in series to each other;

a circulating-current control unit configured to generate a common command value common to all three phases of the delta connection unit, the common command value computed from a complex conjugate $i_z^*$ of a circulating current $i_z$ in the delta connection unit, the common command value provided in a feedback loop for generating commands respective to each of the three phases of the delta connection unit, wherein the complex conjugate $i_z^*$ is calculated by summing three values, each value obtained by multiplying a difference between a DC-capacitor three-phase average value and a DC-capacitor by-phase average value for a corresponding phase by a gain and then giving a phase amount to the multiplied difference, wherein the DC-capacitor three-phase average value is obtained by averaging voltage values of the DC capacitors at all of the three phases, wherein each DC-capacitor by-phase average value is obtained by averaging voltage values of the DC capacitor at the corresponding phase.

2. The power converter according to claim 1, further comprising:

a balancing control unit that generates a second command value, for the one or each of the plurality of bridge-cells at each of the phases, for controlling switching operations of the semiconductor switches in the corresponding bridge-cell, by using a value that is obtained by multiplying a difference between the DC-capacitor by-phase average value for the corresponding phase and a voltage value of the DC capacitor in the corresponding bridge-cell by a value of an AC current flowing into the corresponding phase.

3. The power converter according to claim 2, further comprising: an electric power control unit that generates a third command value for performing at least one of positive-sequence reactive power control, negative-sequence reactive power control, and active power control.

4. The power converter according to claim 3, further comprising:

a switching command value generating unit for generating a switching command value to control switching operations of the semiconductor switches in each of the bridge-cells, by using the command value, the second command value, and the third command value.

5. The power converter according to claim 1, wherein each of the semiconductor switches comprises:

a semiconductor switching device that causes a current to flow in one direction therethrough at the time of being turned on; and a feedback diode connected in antiparallel to the semiconductor switching device.

6. A method of controlling a power converter that includes a DC capacitor; semiconductor switch groups, each of which includes two semiconductor switches connected in series to each other; one or a plurality of bridge-cells, each of which includes the DC capacitor and the two semiconductor switches, which are connected in parallel to the DC capacitor; a delta connection unit at which one or a plurality of bridge-cells are delta-connected, each of the bridge-cells being connected in series to each other; and a circulating-current control unit, the method comprising:

generating a common command value common to all three phases of the delta connection unit, the common command value computed from a complex conjugate $i_z^*$ of a circulating current $i_z$ in the delta connection unit; and providing the common command value in a feedback loop for generating commands respective to each of the three phases of the delta connection unit, wherein the complex conjugate $i_z^*$ is calculated by summing three values, each value obtained by multiplying a difference between a DC-capacitor three-phase average value and a DC-capacitor by-phase average value for a corresponding phase by a gain and then giving a phase amount to the multiplied difference, wherein the DC-capacitor three-phase average value is obtained by averaging voltage values of the DC capacitors at all of the three phases, wherein each DC-capacitor by-phase average value is obtained by averaging voltage values of the DC capacitor at the corresponding phase.

7. The method according to the claim 6, further comprising:

generating a second command value, for the one or each of the plurality of bridge-cells at each of the phases, for controlling switching operations of the semiconductor switches in the corresponding bridge-cell, by using a value that is obtained by multiplying a difference between the DC-capacitor by-phase average value for the corresponding phase and a voltage value of the DC capacitor in the corresponding bridge-cell by a value of an AC current flowing into the corresponding phase.

8. The method according to the claim 7, further comprising:

generating a third command value for performing at least one of positive-sequence reactive power control, negative-sequence reactive power control, and active power control.

9. The method according to the claim 8, further comprising:

generating a switching command value to control switching operations of the semiconductor switches in each of the bridge-cells, by using the common command value, the second command value, and the third command value.

10. The method according to the claim 6, wherein each of the semiconductor switches comprises:

a semiconductor switching device that causes a current to flow in one direction therethrough at the time of being turned on; and a feedback diode connected in antiparallel to the semiconductor switching device.

* * * * *